United States Patent
Abraham et al.

(10) Patent No.: US 8,234,499 B2
(45) Date of Patent: Jul. 31, 2012

(54) ADAPTIVE AUTHENTICATION SOLUTION THAT REWARDS ALMOST CORRECT PASSWORDS AND THAT SIMULATES ACCESS FOR INCORRECT PASSWORDS

(75) Inventors: Subil M. Abraham, Plano, TX (US); Lee A. Carbonell, Flower Mound, TX (US); Tsz Simon Cheng, Grand Prairie, TX (US); Mathews Thomas, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 1051 days.

(21) Appl. No.: 11/768,693

(22) Filed: Jun. 26, 2007

(65) Prior Publication Data
US 2009/0006856 A1  Jan. 1, 2009

(51) Int. Cl.
*G06F 21/00* (2006.01)
(52) U.S. Cl. ............... 713/182; 713/184; 726/2; 726/5; 726/28
(58) Field of Classification Search ....... 726/5; 713/182
See application file for complete search history.

(56) References Cited

U.S. PATENT DOCUMENTS

| | | | |
|---|---|---|---|
| 5,721,780 A * | 2/1998 | Ensor et al. | 713/155 |
| 6,405,318 B1 * | 6/2002 | Rowland | 726/22 |
| 6,591,265 B1 * | 7/2003 | Erickson et al. | 1/1 |
| 7,089,212 B2 | 8/2006 | Schull | |
| 2002/0046351 A1 * | 4/2002 | Takemori et al. | 713/201 |
| 2002/0126694 A1 | 9/2002 | Kahola | |
| 2002/0157021 A1 * | 10/2002 | Sorkin et al. | 713/201 |
| 2004/0111636 A1 * | 6/2004 | Baffes et al. | 713/201 |
| 2005/0154926 A1 * | 7/2005 | Harris | 713/202 |
| 2006/0161786 A1 * | 7/2006 | Rao | 713/183 |
| 2007/0250920 A1 * | 10/2007 | Lindsay | 726/7 |

FOREIGN PATENT DOCUMENTS

TW  561748 A  11/2003

OTHER PUBLICATIONS

Verma et al., "Multi-Module Security : Bio-Secure Steganographic System," Feb. 2010, Proceedings of the 4th National Conference INDIACom-2010.*

(Continued)

*Primary Examiner* — Taghi Arani
*Assistant Examiner* — Thaddeus Plecha
(74) *Attorney, Agent, or Firm* — Patents On Demand; Brian K. Buchheit; Scott M. Garrett

(57) ABSTRACT

In the invention, incorrect authentication information for accessing at least one secured computing asset can be received. A similarity score between the incorrect authentication information and correct authentication information can be determined. One of many different access levels can be assigned to a computing session based upon the similarity score. Access consistent with the assigned access level can be granted. One access level can be an emulation access level that grants access to at least one simulated asset designed to mimic the secured asset. Access to the simulated asset can be provided in a fashion so that a user, who is likely an intruder, is unaware that they are not receiving the secured asset information. A tracking action can be optionally initiated against the intruder. Further, user behavior with the simulated session or a limited access session can be compared against a behavior profile to dynamically increase or decrease session permissions.

19 Claims, 2 Drawing Sheets

OTHER PUBLICATIONS

Grimm, R., et al., "Separating access control policy, enforcement, and functionality in extensible systems", ACM Transactions on Computer Systems (TOCS), vol. 19, No. 1, pp. 36-70, Feb. 2001.

Kraft, R., "Designing a distributed access control processor for network services on the Web," Proceedings of the 2002 ACM Workshop on XML Security, Session 2: Secure Web Services, pp. 36-52, 2002.

Friday, A., et al., "Network layer access control for context-aware IPv6 applications," Wireless Networks, vol. 9, No. 4, pp. 299-309, Jul. 2003.

Qin, F., et al., "LIFT: A low overhead practical information flow tracking system for detecting security attacks," Proceedings of the 39th Annual IEEE/ACM International Symposium on Microarchitecture, pp. 135-148, 2006.

* cited by examiner

ADAPTIVE AUTHENTICATION SOLUTION THAT REWARDS ALMOST CORRECT PASSWORDS AND THAT SIMULATES ACCESS FOR INCORRECT PASSWORDS

BACKGROUND

1. Field of the Invention

The present invention relates to the field of computer security and, more specifically, to an adaptive authentication solution that rewards almost correct passwords and that simulates access for incorrect passwords.

2. Description of the Related Art

Currently, many of today's computer systems allow users to access their data through a password based authentication scheme. While this can be convenient for some users, the majority of users often experience problems with this type of security. Many times, users forget their passwords or only partially remember the passwords. As a result, users often choose simple passwords that are easy for intruders to guess.

Additionally, intruders frequently obtain passwords to users' accounts through a brute force dictionary attack, whereby a large series of passwords are automatically attempted until a match is found. Easy to guess passwords are quickly discovered and allow intruders to gain access to the users' account and the system. A side effect of a brute force attack by an intruder results in reduced performance of the computer system being attacked. That is, processing brute force access attempts can consume system resources which results in performance degradations.

Further, multiple attempts to access a user's account can result in an account lock-out, even if a legitimate user is trying to access their account. Account lock-outs usually require an administrative entity to unlock the account which can cost time and money. Still further, an intruder can maliciously cause account lock-outs thus denying access to legitimate users. This situation negatively impacts the user, the computer systems, and associated organizations. A solution could be devised to solve problems associated with intrusion attacks and exact matching password authentication schemes. It would be beneficial if an adaptive access control scheme existed based on a password authentication scheme.

SUMMARY OF THE INVENTION

The present invention discloses an adaptive authentication solution that rewards almost correct passwords and that simulates access for incorrect passwords. In the solution, an authorization mechanism can determine whether an incorrect password was most likely provided by an intruder or by a user that forgot their password.

Intruders are granted access to a simulated system not containing sensitive information. The simulated system prevents intruders from easily distinguishing a successful intrusion attempt from an unsuccessful one. Further, intruder's interactions with the simulated system can be designed to track and identify the intruder so that punishment actions can be taken. For example, tracking keys can be hidden in information downloaded from the simulated system.

In contrast, a similar password can grant a user partial access to a system. User behavior with the limited access system can be recorded and compared against previously recorded behavioral metrics stored with a user profile. User permissions can dynamically increase/decrease depending on comparison results. Various behavioral metrics can be used for identification purposes including, but not limited to, Web browsing behavior, key press characteristics, interaction pace, and the like. When behavior contradicts the profile behavior, access can be decreased. However, when behavior matches profile behavior, access can be increased. Changes in access level can result in access to a production system with access from a simulated system and vice versa. Further, intruder tracking actions and password re-verification/change actions can be associated with various confidence levels of a user's identity which can dynamically change based on behavioral comparisons.

The present invention can be implemented in accordance with numerous aspects consistent with the material presented herein. For example, one aspect of the present invention can include a method to authenticate users of a computing system. In the method, incorrect authentication information for accessing at least one secured computing asset can be received. A similarity score between the incorrect authentication information and correct authentication information can be determined. One of many different access levels can be assigned to computing sessions based upon the similarity score. Access consistent with the assigned access level can be granted. One access level can be an emulation access level that grants access to at least one simulated asset designed to mimic the secured asset. Access to the simulated asset, can be provided in a fashion so that a user, who is likely an intruder, is unaware that they are not receiving the secured asset information. A tracking action can be optionally initiated against the intruder. Further, user behavior with the simulated session or a limited access session can be compared against a behavior profile to dynamically increase or decrease session permissions.

Another aspect of the present invention can include a security system for accessing secure content. The security system can include a password similarity engine, an authentication engine, a secure asset server, and a simulated server. The similarity engine can determine a similarly score between an incorrect password and a correct password. The authentication engine can grant users varying levels of access to secured computing resources based upon the similarity score determined by the similarity engine. The secure asset server can manage secured assets accessible by authorized users. A user providing a correct password to the security system can be granted full-user access to an approved set of the secured assets associated with that user. A user providing an incorrect password that has a similarity score over an established threshold can be granted limited-user access to at least a portion of the approved set of the secured assets associated with that user. The simulated server can manage simulated assets designed to mimic the secured assets. A user providing an incorrect password that has a similarity score under a specified threshold can be granted access to at least a portion of the simulated assets. The simulated assets lack accurate information that is included in the secured assets that are being mimicked. The system can be designed so that a user is unaware of whether they have been granted full access, limited access, or simulated access.

Still another aspect of the present invention can include a security system for accessing secure content, which includes a secure asset server, an authentication engine, a behavior metric database, a behavior tracking engine, and an access adjustment engine. The secure asset server can manage secured assets accessible by authorized users. The authentication engine can grant users varying levels of access to secured computing resources managed by the secure asset server. The behavior metric database can store behavioral metrics for a set of authorized users of the secure asset server. The behavior tracking engine can ascertain user behavior for a computing session. The access adjustment engine can dynamically modify an access level of the computing session based upon comparisons of the ascertained user behavior and the stored behavioral metrics. Negative comparison determinations can result in a lowering of the access level. Positive comparison determinations can result in an increase of the access level of the computing session.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
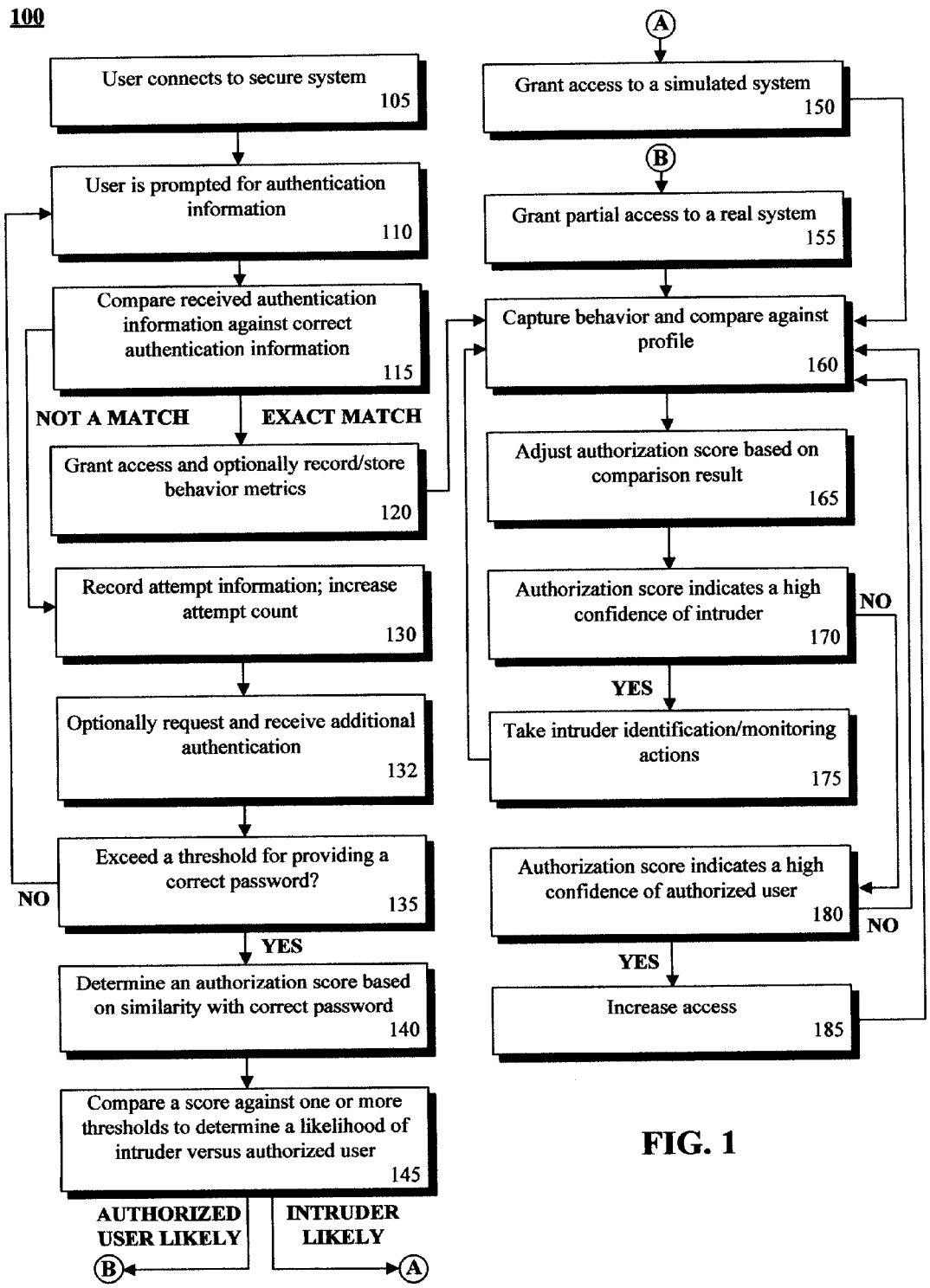
FIG. 1 is a flowchart diagram illustrating an adaptive access control method that rewards partially correct passwords with limited access and incorrect passwords with simulated access in accordance with an embodiment of inventive arrangements disclosed herein.

FIG. 1 is a flowchart diagram illustrating adaptive access control method 100 that rewards partially correct passwords with limited access and incorrect passwords with simulated access in accordance with an embodiment of inventive arrangements disclosed herein. Method 100 can be employed to provide a means of authentication and verification for secure system assets. Actions can be taken when user provided authentication information is correct, partially correct, and incorrect. These actions can grant full access, partial access, and simulated access, respectfully. Simulated access can be designed to fool intruders into thinking that they have successfully bypassed security. Tracking actions can be optionally initiated against these potential intruders. In one implementation, interactive behavior can be determined for users granted partial or simulated access which is compared against a behavior profile to dynamically increase or decrease initially granted permissions.

The method 100 can begin in step 105, where a user connects to a secure system and/or a secure asset. In step 110, the user can be prompted for authentication information which can take the form of a password, secure certificate, authentication token, and the like. In step 115, an authentication system can compare received authentication information against correct authentication information. When this information is correct, the user can be granted access in step 120. The user's behavior can also be optionally recorded in a user specific behavior profile. The method can proceed from step 120 to step 160, where user behavior can be used to dynamically change permissions granted to the user.

When the authentication information is not an exact match, the method can proceed from step 115 to step 130, where attempt information can be recorded. For example, an attempt count can be increased. In optional step 132, additional authentication information/options can be presented. For example, a user can be asked whether they have forgotten their password and would like it reset, where a temporary password is mailed to their email account. In another example, a user can be asked security questions where a correct answer allows the user to reset their password or to be granted full access despite their lack of providing the correct password. Details of optional set 132 can vary based upon security restrictions imposed for a secure asset for which the method 100 is implemented.

In step 135, a number of attempts can be compared against a maximum attempt threshold. When the threshold is not exceeded, the user can be re-prompted for a password, as shown by looping to step 110. In one embodiment, a randomizing factor can be added to step 135 so that a maximum attempt threshold can vary so that an intruder is not aware that he/she has exceeded a re-prompting threshold.

When the threshold is exceeded, the method can progress from step 135 to step 140, where an authorization score can be determined. This score can be based upon a similarity between the provided password and a correct password. When multiple password entry attempts have been made (e.g., repeats of steps 110-135), an average authorization score can be used in one implementation of the invention. Further, when multiple password attempts are made, comparisons between these attempts and historically correct passwords can also be taken into consideration when determining the authorization score.

The authorization score can be compared against one or more thresholds to determine the likelihood of an intruder versus an authorized user, as illustrated in step 145. When the user is likely an unauthorized intruder, as determined in step 145, the method can proceed to step 150, where access to a simulated system can be granted. This simulated system can be one that does not provide accurate information concerning secure assets, although it can be designed to mimic the secured assets. When the user is likely an authorized user, as determined in step 145, the method can proceed to step 155, where partial access to a secure system can be granted.

Optional steps 160-185 can then be performed, where access is increased/decreased based upon user behavior with the system. In step 160, user behavior can be captured and can be compared to a user behavior profile. Based on the result, the authorization score or a different score indicating a confidence level in the user can be adjusted in step 165. In step 170, when the adjusted score indicates a high confidence level of a user being an intruder, an intruder identification/monitoring action can be taken in step 175.

Otherwise, the method can proceed from step 170 to step 180, where an adjusted score can be compared against one or more thresholds for increasing permissions. When the comparison is positive, access can be increased in step 185. When steps 170 and/or 180 indicate no change is to be made, the method can loop to step 160, where behavior can continue to be determined and permissions can be adjusted accordingly.

Figure 2:
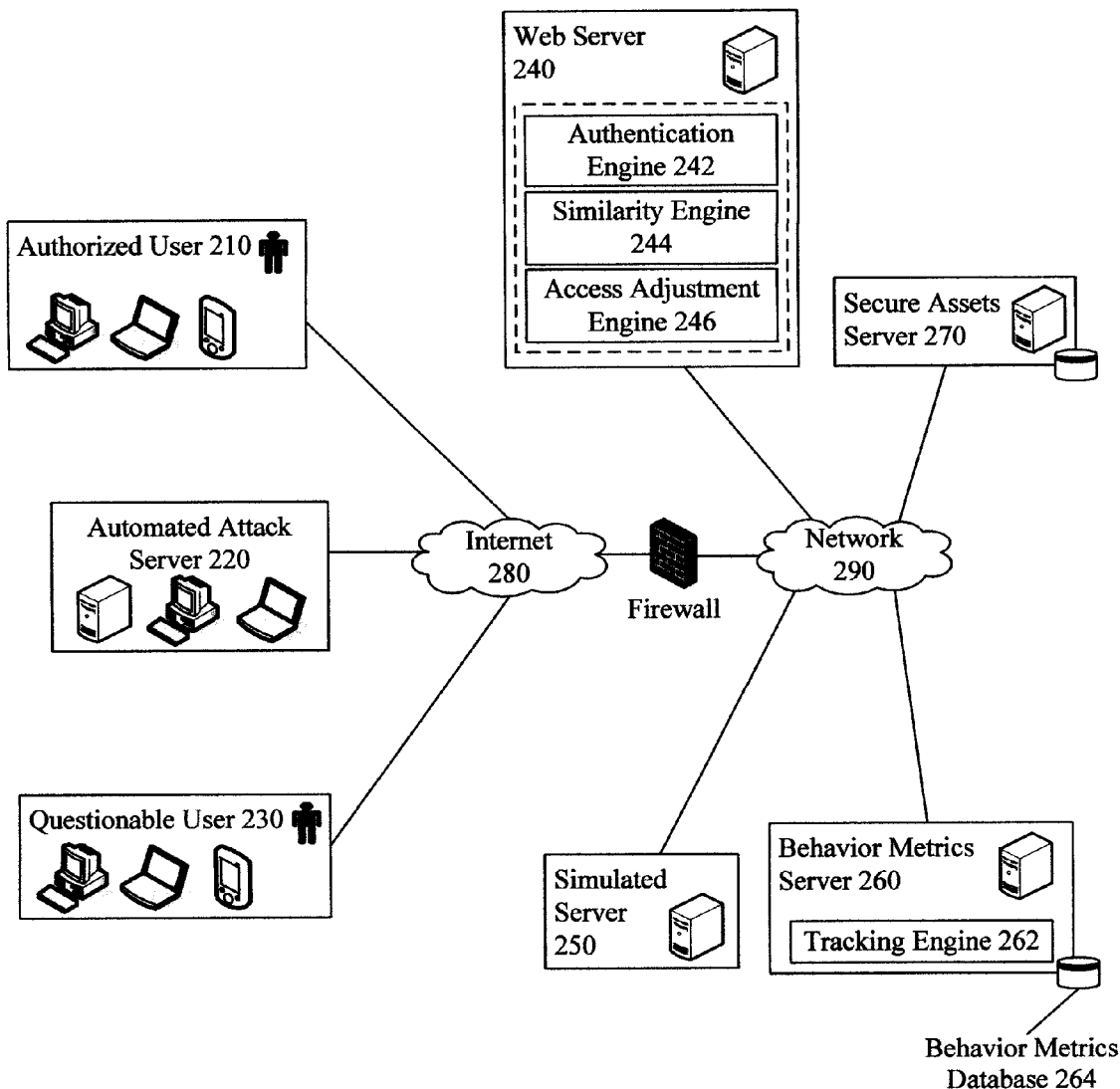
FIG. 2 is a schematic diagram illustrating adaptive an access control system that rewards partially correct passwords with limited access and incorrect passwords with simulated access in accordance with an embodiment of inventive arrangements disclosed herein.

FIG. 2 is a schematic diagram illustrating adaptive access control system 200 that rewards partially correct passwords with limited access and incorrect passwords with simulated access in accordance with an embodiment of inventive arrangements disclosed herein. The steps of method 100 can be performed in the context of system 200.

In system 200, entities 210-230 can attempt to access secure resources provided by server 270. Access can be over in Internet 280 and a network 290 and the secure assets server 270 can optionally be positioned behind a firewall or other security point. In one embodiment, access to the server 270 can be through a Web server 240. Authorized users 210 can be granted full access to server 270 resources. Questionable users 230 can be granted partial access to the resources of server 270. Intruders, represented by automated attack server 220, can be granted access to the simulated server 250, which does not contain sensitive information. A behavior metrics server 260 can determine behavior of questionable users 230 and intruders 220, can compare this behavior against previously recorded metrics (264), and can dynamically increase/decrease permissions based upon these comparisons.

Authorized user 210 can be any user or group of users, which has been granted permission to access secure assets of server 270. An authorized user 210 can be a human agent, a team, a corporation, a type of user, and the like. The authorized user 210 can utilize a computing device, such as a computer, mobile phone, personal data assistant, and the like, to access the secure assets.

Questionable user 230 can include a user whose authentication information partially matches stored authentication information associated with an account. Questionable user 230 can include a human agent that repeatedly inputs authentication information that is close to stored authentication information and/or to authorization information that was historically correct. For example, if a correct password was "ILuvSoap," a password entered by user 230 can include "IloveSoap," "Iluvsoap," and/or "I luvSoap." In addition to creating close derivatives to a correct password, a user 230 can correctly enter historical passwords, which are no longer valid.

Automated attack server 220 (e.g., intruder) can be represented as a person or software program that attempts to gain access to system 270 using common intrusion mechanisms. One common artifact used by the attack server 220 is a dictionary attack based upon personal information for a correct user, such as birthdates, a child's name, a social security number, and the like. A set of commonly used passwords can also be utilized by server 220. These attempts will be characteristically different than those by a questionable user 230.

The secure assets server 270 can include a set of computing resources that include sensitive functionality and/or data. Secure assets server 270 can include personally identifiable information, financial data, and the like. Secure assets server 270 can be protected from unwanted public access through authentication mechanisms that verify the validity of the user. The server 270 content can be encrypted in one embodiment of the invention.

A Web server 240 can be a server, through which entities 210-230 access a secure back-end server 270. The Web server 240 can prompt an entity 210-230 for authentication information and can take actions based upon a receipt of this information. Web server 240 can include an authentication engine 242, a similarity engine 244, an access adjustment engine 246, and the like.

Authentication engine 242 can process authentication information in the form of a password, secure certificate, authentication token, and the like. Based on a comparison of user provided authentication information against stored authentication information, an authorization score can be determined. Different levels of access to secure assets server 270 can be associated with the authorization score.

Similarity engine 244 can include pattern matching algorithms, biometric recognition algorithms, and the like. Similarity engine 244 can determine a similarity score by analyzing stored authentication information against user provided authentication information. A similarity score can be a factor in determining an authorization score for a user.

Access adjustment engine 246 can be used to increase/decrease permissions based upon user behavior. Different configurable thresholds can be configured for the access adjustment engine 246. These thresholds can be linked to a set of programmatic actions, which execute in response. That is, when a current confidence score in an entity 210-230 rises or falls, different thresholds monitored by engine 246 can cause different actions to be taken.

The confidence threshold in an entity's 210-230 identity can be modified by behavior metrics server 260. The behavior metrics server 260 can include a tracking engine 262 and behavior metrics database 264. Behavior metrics server 260 can gather and analyze behavior of users interacting with Web server 240 and simulated server 250.

Tracking engine 262 can monitor usage patterns, resource requests, and mouse/keyboard input from users interacting with servers 240 and 250. Behavior metrics database 264 can store behavior profiles for authenticated users obtained from tracking engine 262. These behavior metrics can be later used to determine authenticity of a user. If it is determined the user is an intruder, data obtained from tracking engine 262 can be used to uniquely identify and locate the intruder. The behavior metrics server 260 is not limited to any particular usage biometric technique and multiple techniques can be combined by server 260 to achieve high confidence levels in a user's identity based upon behavioral characteristics.

The simulated server 250 can include a system that mimics secure assets 270. Simulated server 250 can be a virtual machine, security sandbox, and the like. Simulated server 250 can allow questionable users and intruders to interact with assets that emulate secure assets 270. Simulated server 250 can partially imitate secure assets 270 while also presenting actual secure assets. Behavior metrics can be gathered from users interacting with simulated server 250. Further, simulated server 250 can present simulated assets which can take the form of specialty tagged data that contains hidden tracking information. An entity using tagged data can be identified and tracked. By analyzing the specially tagged data, unauthorized users can be determined and punished accordingly.

As shown herein, each network 280 and 290 can include any hardware/software/and firmware necessary to convey digital content encoded within carrier waves. Content can be contained within analog or digital signals and conveyed through data or voice channels and can be conveyed over a personal area network (PAN) or a wide area network (WAN). The network can include local components and data pathways necessary for communications to be exchanged among computing device components and between integrated device components and peripheral devices. The network can also include network equipment, such as routers, data lines, hubs, and intermediary servers which together form a packet-based network, such as the Internet or an intranet. The network can further include circuit-based communication components and mobile communication components, such as telephony switches, modems, cellular communication towers, and the like. The network can include line based and/or wireless communication pathways.

The elements shown in system 200 can be modified from the embodiment shown and still be considered within the scope of the present invention. For example, the tracking engine 262 shown in server 260 can be optionally integrated into the access adjustment engine 246 and/or into the simulated server 250 in one contemplated implementation of the invention. In another example, the authentication engine 242 and similarity engine 244 or components thereof can be implemented directly within the secure assets server 270 and not within a Web server 240. In still another example, network 280 can represent an internet, a personal area network, or other subnet linked to network 290 instead of being the internet 280.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method to authenticate users of a computing system comprising:
   monitoring a number of attempts of access to at least one secured computing asset;
   receiving, for at least a portion of the attempts, incorrect authentication information for accessing the at least one secured computing asset;
   determining a similarity score for each attempt, wherein for the portion of attempts the determining of the similarly score compares the incorrect authentication information and previously stored correct authentication information;
   computing an average authorization score based on the similarity scores for each attempt, and the number of attempts;
   comparing the average authorization score with an established threshold;
   responsive to the average authorization score being greater than the established threshold, assigning an access level based on the average authorization score, wherein said assigned access level is an emulation access level or a limited access to a portion of at least one secured computing asset; and
   granting access consistent with the assigned access level, wherein said receiving, determining, comparing, assigning, and granting are performed automatically by at least one machine in accordance with at least one computer program having a plurality of code sections that are executable by the at least one machine, said at least one computer program being stored in a non-transitory machine readable medium.

2. The method of claim 1, wherein the assigned access level is the emulation access level, wherein said granting step grants access to at least one simulated asset designed to mimic the secured computing asset wherein the simulated asset lacks accurate information that is included in the secured assets, and wherein the granting step occurs in a manner designed to obscure a fact that access has been provided for the simulated asset instead of the secured asset.

3. The method of claim 2, further comprising:
   initiating at least one tracking action designed to determine an identity and associated information for a user of the computing session which has been assigned the emulation access level, whereby unauthorized intruders are able to be granted access to the simulated assets without their awareness while the intruders are being tracked by the initiated tracking action.

4. The method of claim 1, further comprising:
   after granting access for at least one of the attempts, recording computing session behavior;
   for the at least one of the attempts, comparing the recorded computing session behavior of a user against a profile established for a user identity associated with the correct authentication information; and
   for the at least one of the attempts, dynamically changing the assigned access level of a current computing session based upon results of the comparing step.

5. The method of claim 4, further comprising:
   for the current computing session, programmatically determining based upon the recorded computing session behavior and based upon the average authorization score that a user of the current computing session is an authorized user; and
   for the current computing session, increasing the assigned access level for the at least one secured computing asset to grant full access to the authorized user.

6. The method of claim 4, further comprising:
   for the current computing session, programmatically determining based upon the recorded computing session behavior and based upon the average authorization score that a user of the current computing session is a potential intruder; and
   for the current computing session, decreasing the assigned access level so that after the changing step, the user is granted access to the at least one simulated asset, wherein before the changing step access was granted to the secured computing asset which the simulated asset mimics.

7. The method of claim 4, further comprising:
   for the current computing session, programmatically determining based upon the recorded computing session behavior and based upon the average authorization score that a user of the current computing session is a potential intruder; and
   for the current computing session, initiating at least one tracking action designed to determine an identity, a location, and associated information for the potential intruder.

8. The method of claim 1, wherein an average authorization score needed as a minimum for full access to the at least one secured computing asset is greater than a different average authorization score that is needed as a minimum for the limited access.

9. A security system for accessing secure content comprising:
- a similarity engine, comprising a program stored on a non-transitory medium, where said program is able to be executed by hardware, configured to determine a similarity score by comparing an incorrect password and a previously stored correct password;
- at least one program stored on a non-transitory storage medium configured to monitor a number of attempts to access secured assets, and to compute average authorization scores based on the similarity scores for each of the attempts and based on the number of the attempts;
- an authentication engine, comprising a program stored on a non-transitory medium, where said program is able to be executed by hardware, configured to grant users varying levels of access to the secured assets, wherein a granted level of access is based upon the computed average authorization score;
- a secure asset server, comprising a combination of hardware and software, configured to manage secured assets accessible by authorized users, wherein a user providing a correct password to the security system is granted full user access to an approved set of the secured assets associated with that user, wherein a user providing an incorrect password that has an average authorization score over an established threshold is granted limited-user access to at least a portion of the approved set of the secured assets associated with that user; and
- a simulated server, comprising a combination of hardware and software, configured to manage simulated assets designed to mimic the secured assets, wherein a user providing an incorrect password that has an average authorization score under the established threshold is granted access to at least a portion of the simulated assets, wherein the simulated assets lack accurate information that is included in the secured assets that are being mimicked by the simulated assets.

10. The security system of claim 9, wherein the security system is configured to selectively provide the secured assets and the simulated assets in a fashion that a receiving user is unable to distinguish which type of assets are being received.

11. The security system of claim 9, wherein users granted at least one of limited-user access and access to the simulated assets are unable to discern that full-user access has been denied.

12. The security system of claim 9, further comprising:
- a tracking engine, comprising a program stored on a non-transitory medium, where said program is able to be executed by hardware, configured to take at least one programmatic action designed to determine an identity and associated information for a user who has received an average authorization score below an established threshold.

13. The security system of claim 9, further comprising:
- a behavior metric database configured to store behavioral metrics for a plurality of authorized users of the secure asset server;
- a behavior tracking engine, comprising a program stored on a non-transitory medium, where said program is able to be executed by hardware, configured to ascertain user behavior for a computing session for which at least one of limited-user access and access to the simulated assets has been granted; and
- an access adjustment engine, comprising a program stored on a non-transitory medium, where said program is able to be executed by hardware, configured to dynamically modify an access level granted to the computing session based upon comparisons of the ascertained user behavior and the stored behavioral metrics associated with a user identity associated with the computing session.

14. The security system of claim 13, wherein when the access level is dynamically increased beyond the established threshold, one of the users is situationally presented with the secured assets from the secure asset server where prior to the dynamic increase the user was presented with simulated assets from the simulated server.

15. The security system of claim 13, wherein when the access level is dynamically decreased below the established threshold, a user is situationally presented with the simulated assets from the simulated server where prior to the dynamic decrease the user was presented with secured assets from the secure asset server.

16. A computer program product comprising:
- one or more computer-readable, tangible storage devices;
- program instructions, stored on at least one of the one or more storage devices, to monitor a number of attempts of access to at least one secured computing asset;
- program instructions, stored on at least one of the one or more storage devices, to receive, for at least a portion of the attempts, incorrect authentication information for accessing the at least one secured computing asset;
- program instructions, stored on at least one of the one or more storage devices, to determine a similarity score for each attempt, wherein for the portion of attempts the determining of the similarly score compares the incorrect authentication information and previously stored correct authentication information;
- program instructions, stored on at least one of the one or more storage devices, to compute an average authorization score based on the similarity scores for each attempt, and the number of attempts;
- program instructions, stored on at least one of the one or more storage devices, to compare the average authorization score with an established threshold;
- program instructions, stored on at least one of the one or more storage devices, to, responsive to the average authorization score being greater than the established threshold, assign an access level based on the average authorization score, wherein said assigned access level is an emulation access level or a limited access to a portion of at least one secured computing asset; and
- program instructions, stored on at least one of the one or more storage devices, to grant access consistent with the assigned access level.

17. The computer program product of claim 16, wherein the assigned access level is the emulation access level, wherein said program instructions to grant access are to grant access to at least one simulated asset designed to mimic the secured computing asset wherein the simulated asset lacks accurate information that is included in the secured assets, and wherein said program instructions to grant access do so in a manner designed to obscure a fact that access has been provided for the simulated asset instead of the secured asset.

18. The computer program product of claim 17, further comprising:
- program instructions, stored on at least one of the one or more storage devices, to, for at least the portion of the attempts, initiate at least one tracking action designed to determine an identity and associated information for a user of the computing session which has been assigned the emulation access level, whereby unauthorized intruders are able to be granted access to the simulated assets without their awareness while the intruders are being tracked by the initiated tracking action.

19. The computer program product of claim 16, further comprising:

program instructions, stored on at least one of the one or more storage devices, to, after granting access for at least one of the attempts, record computing session behavior;

program instructions, stored on at least one of the one or more storage devices, to, for the at least one of the attempts, compare the recorded computing session behavior of a user against a profile established for a user identity associated with the correct authentication information; and program instructions, stored on at least one of the one or more storage devices, to, for the at least one of the attempts, dynamically change the assigned access level of a current computing session based upon results of comparing the recorded computing session behavior.

* * * * *